United States Patent [19]
Azar et al.

[11] 3,912,678
[45] Oct. 14, 1975

[54] COMPOSITION FOR EARTH COMPACTING

[75] Inventors: David Azar; Keith P. Lanneau, both of Baton Rouge, La.

[73] Assignee: Roadways International Corporation, Baton Rouge, La.

[22] Filed: Nov. 28, 1973

[21] Appl. No.: 419,867

Related U.S. Application Data

[62] Division of Ser. No. 199,758, Nov. 17, 1971, Pat. No. 3,817,643.

[52] U.S. Cl............ 260/28.5 AS; 106/277; 106/281; 260/17.4 SG
[51] Int. Cl.²......................................... C08L 95/00
[58] Field of Search............. 260/17.4 SG, 28.5 AS; 106/277, 281

[56] References Cited
UNITED STATES PATENTS

| | | | |
|---|---|---|---|
| 2,454,506 | 3/1974 | Fischer | 260/765 |
| 2,789,917 | 4/1957 | Hardman et al. | 106/277 |
| 3,085,889 | 4/1963 | Swift | 106/277 |
| 3,206,319 | 9/1965 | Minnick et al. | 106/277 |
| 3,520,709 | 7/1970 | Mogg et al. | 106/277 |
| 3,577,250 | 5/1971 | Rostler | 106/277 |

*Primary Examiner*—Melvyn I. Marquis
*Attorney, Agent, or Firm*—Connolly & Hutz

[57] ABSTRACT

A method for making a dirt road base, which method comprises loosening the ground to a depth of at least about two inches, mixing the loosened earth with an aqueous dispersion of asphalt containing dispersed calcium hydroxide, to provide it with moisture and asphalt contents that give it the desired strength after compacting, and then rolling the mixed product to form the desired base.

6 Claims, No Drawings

COMPOSITION FOR EARTH COMPACTING

This application is a division of application Ser. No. 199,758 filed Nov. 17, 1971, U.S. Pat. No. 3,817,643 granted June 18, 1974.

The present invention relates to bases for roadways that carry traffic, and to compositions for forming such bases.

Among the objects of the present invention is the provision of a novel method for forming road bases, as well as novel compositions for use in such formation.

The foregoing as well as additional objects of the present invention will be more fully presented by the following description of several of its exemplifications.

According to the present invention a good quality roadway base is inexpensively made by loosening the ground to a depth of two to six inches, mixing the loosened earth with an aqueous asphalt emulsion containing dispersed calcium hydroxide in an amount about 5 to 20% by weight of the asphalt, and then compacting the mixed material by rolling to form the desired roadway base. The proportion of the emulsion mixed with the earth can be varied so as to provide an asphalt concentration that provides the desired strength for the completed base, and the dilution of the emulsion can be varied to provide the compacted earth mixture with the optimum moisture content that develops the desired strength.

It is a feature of the present invention that not only does the asphalt contribute substantial strengthening, but the calcium hydroxide assists in getting the asphalt thoroughly distributed in the loosened earth. This assistance is particularly important where the earth has a significant clay content. Simple asphalt emulsions will not penetrate or will not adequately penetrate into clay and will not properly strengthen clayey earth, but the presence of the calcium hydroxide in the asphalt emulsion pursuant to the present invention greatly improves the penetration obtained when the emulsions are mixed with the loosened earth.

Even in sandy type soils the calcium hydroxide helps inasmuch as calcium hydroxide particles are deposited among the sand grains and may increase the strength of the non-cohesive sand.

The asphalt emulsions containing calcium hydroxide give even better results when they also contain a little tack-providing rubber. Only about 1 to 3% of such rubber based on the weight of the asphalt is sufficient for this purpose.

Where the emulsions are to be stored it is also helpful to add to them about ½ to 2% sugar (sucrose). This reduces the tendency for the calcium hydroxide particles to pack upon standing. The calcium hydroxide is present in an amount greater than that which dissolves in the aqueous phase of the emulsion so that most of the calcium hydroxide is in the form of suspended particles, and these particles settle to the bottom of the container on standing. In the presence of the sugar the settled particles are readily re-dispersed upon mild agitation; without the sugar the settled particles pack and may need forceful disturbance before they are re-dispersed.

The following is a preferred example of an emulsion formulation according to the present invention:

| | |
|---|---|
| Asphalt emulsion SS-1h (60% asphalt by weight) | 230 gallons |
| p-(1,1,3,3-tetramethyl)butyl-phenoxy pentadecaethoxy ethanol (35% by weight in water) | 9.2 gallons |
| anionic SBR latex (35% solids by weight) | 6.0 gallons |
| calcium hydroxide powder | 125 pounds |
| sugar | 25 pounds |
| water | 20 gallons |

The ingredients are mixed in the order listed, and the formulation is then ready for immediate use or for storage and/or shipment. The second ingredient is a stabilizer and where the formulation is to be used within about 48 hours and is not shipped any significant distance or subjected to freezing, the stabilizer content can be reduced to about half that shown.

The asphalt of the foregoing emulsion has a moderate penetration (40 to 90 at 77°F for 5 seconds with a 100 gram weight) and a low softening temperature (about 118°F). Higher softening temperatures are not desirable, but can be used effectively in the warmer climates. Asphalts with softening temperatures below about 90°F – 100°F are generally sufficiently sticky to be used with very little or no rubber.

Asphalts of varying hardness can be used in the formulations of the present invention, with penetrations as great as 200 and as small as 30.

The formulations of the present invention can be anionic, non-ionic or cationic dispersions. The asphalt emulsion and rubber latex ingredients of these formulations should not be of such character that they react together to cause flocculation. Thus when the asphalt emulsion is anionic the latex can be anionic or non-ionic; when the asphalt emulsion is cationic the latex can be cationic or non-ionic; and when the asphalt emulsion is non-ionic the latex can be non-ionic, anionic or cationic.

While the p-octyl phenoxy polyethoxy phenols have been found particularly effective in stabilizing the formulations of the present invention, especially when there are at least six ethylene oxide groups in the polyethoxy chain connecting the ethanol group with the benzene ring, other stabilizers such as the anionic, non-ionic, cationic and amphoteric stabilizers referred to in U.S. Patent No. 3,418,249 granted Dec. 24, 1968, can also be used. Larger quantities of these other stabilizers might be desirable however.

It is preferred that the rubber, where used, have a fairly low softening temperature so as to provide a highly desirable tack at below-ground levels where the temperature can be as low as 50°F or lower. Other tack-providing rubbers of latices such as EPR (ethylene-propylene copolymer rubber) can be used in place of the SBR rubber, and even the less weather-resistant types of rubber such as natural rubber can be used.

For best results the following procedure should be used in building the roadway base according to the present invention;

1. The first step is to break or scarify the road to the depth for which stabilization is desired (usually 2–6 inches). This may be accomplished on either dirt or mixed dirt-gravel roads by using a scarifier attachment on a motor grader. In proceeding with this first step it is assumed that the road or street is already properly drained and at the approximate grade desired.

2. It is desirable to break up and pulverize the soil as well as possible, mixing the soil well with any aggregate present. Ideally, this should be continued until approximately 80% of the soil, excluding aggregate, will pass a No. 4 sieve.

3. When soil pulverizing and shaping is completed it is preferable to windrow the soil to the side of the road. Then a pass is made with a spray truck that applies the formulation of the present invention appropriately diluted with additional water. Only about half of the total amount of the formulation is applied in this pass. The soil is then bladed over with a motor grader to get good mixing of the applied formulation with the soil. At least one more pass of the spray truck is made to apply the balance of the formulation, after which the soil is again mixed with the motor grader. The mixing is preferably effected immediately after the application of the formulation, as by having the motor grader closely follow the spray truck. A typical application to a soil that is about 25% clay is about 1 gallon of the above-described formulation per square yard of 4 inch depth roadbed, the formulation being first diluted 1:5 with additional water. However the dilution can range from about 1:1 to about 1:10 and the total amount of formulation can vary from about 2/10 to about 2 gallons per square yard 4 inches deep. The exact dilution and amount of application is best determined by testing samples of the loosened soil, each with a different amount of added formulation. Such samples can be compacted into cylinders, cured by baking at 150°F for 3 hours, followed by 2 hours standing at room temperature, after which they are placed in contact with water for four hours. The resulting cylinders are then subjected to greater and greater compacting pressures to determine how much they will withstand. This final compaction can be effected in cylindrical frames having side openings through which the soil will be forced when the compacting pressure exceeds that which the soil will withstand. The minimum amount of formulation required to attain specification pressure is then selected.

The amount of dilution is then adjusted so that the freshly mixed soil is brought to the optimum moisture content for compaction. This content can also be tested by a compacting operation without preliminary curing.

4. The final mixed soil is now compacted as by means of 5 to 10 passes with either a heavy steel or rubber-tired roller. Ideally compaction should take place when the soil is either at or slightly below optimum moisture level. If the soil has inadvertently been over-wetted during the stabilization steps, the road should be allowed to dry until the excess moisture is dissipated.

The compactor will leave the road in a hard smooth condition practically ready to receive a blacktop pavement or even a concrete pavement. Before a blacktop covering is applied the roadbed can be given a further light coating of asphalt from a solution in a suitable solvent such as naphtha. About 0.1 to 0.2 gallon of such a 60% solution of asphalt per square yard provides a seal coat and a temporary riding surface that will withstand light traffic such as light airplanes, for as long as a year. This will also act as a primer to better receive the blacktop.

Where the final roadway is only subjected to light loads, as for example when used as a landing strip for light airplanes, the roadbed with the primer coating is all that is needed. Regardless of how used, however, the roadbed of the present invention is very inexpensive to prepare and does a creditable job.

Obviously many modifications and variations of the present invention are possible in the light of the above teachings. It is, therefore, to be understood that within the scope of the appended claims the invention may be practiced otherwise than as specifically described.

What is claimed:

1. An article of commerce which is essentially an aqueous emulsion of earth-penetrating asphalt containing dispersed particles of calcium hydroxide in an amount greater that 5% based on the weight of the asphalt and so large that most of these particles do not dissolve but are suspended in the emulsion, the asphalt concentration being at least about 5% by weight of the composition.

2. The combination of claim 1 in which the asphalt concentration is at least about 40% by weight and the composition contains an anti-packing agent in an amount that keeps the calcium hydroxide particles from packing.

3. The combination of claim 1 in which the composition also contains a dispersed tack-providing amount of rubber.

4. A concentrate for mixing with earth to prepare it for compacting, the concentrate being essentially a concentrated aqueous emulsion of earth-penetrating asphalt containing a dispersed tack-providing amount of rubber, and also containing dispersed particles of calcium hydroxide in an amount greater than 5% based on the weight of the asphalt and so large that most of these particles do not dissolve but are suspended in the emulsion.

5. The combination of claim 4 in which the calcium hydroxide content of the concentrate is no greater than 20% based on the weight of the asphalt, the rubber content of the concentrate is from about 1 to about 3% based on the weight of the asphalt, and the concentrate also contains about ½ to 2% sugar.

6. The combination of claim 4 in which the emulsion also contains an anti-packing agent in an amount that keeps the calcium hydroxide particles from packing.

* * * * *